US012536982B2

(12) United States Patent

Osuga et al.

(10) Patent No.: US 12,536,982 B2

(45) Date of Patent: Jan. 27, 2026

(54) SOUND BAR AND PERCUSSION INSTRUMENT

(71) Applicant: YAMAHA CORPORATION, Hamamatsu (JP)

(72) Inventors: Ichiro Osuga, Hamamatsu (JP); Ayumi Irisa, Hamamatsu (JP); Kazuki Soga, Hamamatsu (JP); Junnosuke Kaseda, Hamamatsu (JP); Hisaaki Mukai, Hamamatsu (JP); Eri Hirai, Hamamatsu (JP); Yuichi Tadano, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 206 days.

(21) Appl. No.: 18/474,405

(22) Filed: Sep. 26, 2023

(65) Prior Publication Data

US 2024/0013753 A1 Jan. 11, 2024

Related U.S. Application Data

(63) Continuation of application No. PCT/JP2022/013719, filed on Mar. 23, 2022.

(30) Foreign Application Priority Data

Apr. 2, 2021 (JP) ............................. JP2021-063501

(51) Int. Cl.
*G10D 13/10* (2020.01)

(52) U.S. Cl.
CPC .................................... *G10D 13/10* (2020.02)

(58) Field of Classification Search
CPC ........ G10D 13/10; G10D 13/08; G10D 13/24; G10D 13/25
See application file for complete search history.

(56) References Cited

U.S. PATENT DOCUMENTS 4,411,187 A * 10/1983 Roper .................... G10D 13/08 984/155
4,805,513 A * 2/1989 Ito ............................. B32B 5/28 984/155

(Continued)

FOREIGN PATENT DOCUMENTS

JP S53164819 U 12/1978
JP H08202351 A 8/1996

(Continued)

OTHER PUBLICATIONS

English translation of Written Opinion issued in Intl. Appln. No. PCT/JP2022/013719 mailed Jun. 21, 2022, previously cited in IDS filed Sep. 26, 2023.

(Continued)

*Primary Examiner* — Erin Kryukova
(74) *Attorney, Agent, or Firm* — ROSSI, KIMMS & McDOWELL LLP

(57) ABSTRACT

A sound bar includes an elongated member having a striking surface having an elongated shape. A weight of a striking surface side area of the elongated member, per unit volume of the striking surface side area of the elongated member, changes along a longitudinal direction of the striking surface. The striking surface side area is defined in a range of a uniform thickness from the striking surface.

14 Claims, 4 Drawing Sheets

(56) References Cited

U.S. PATENT DOCUMENTS

| | | | | |
|---|---|---|---|---|
| 5,686,679 | A | 11/1997 | Nakano et al. | |
| 2003/0167899 | A1 * | 9/2003 | Abe | G10D 13/06 84/402 |
| 2018/0122343 | A1 * | 5/2018 | Hirai | G10D 13/24 |

FOREIGN PATENT DOCUMENTS

| | | | |
|---|---|---|---|
| JP | 2003084759 | A | 3/2003 |
| JP | 2018072656 | A | 5/2018 |

OTHER PUBLICATIONS

International Search Report issued in Intl. Appln. No. PCT/JP2022/013719 mailed Jun. 21, 2022. English translation provided.

Written Opinion issued in Intl. Appln. No. PCT/JP2022/013719 mailed Jun. 21, 2022.

Office Action issued in Japanese Appln. No. 2023-511089 mailed Sep. 17, 2024. English translation provided.

* cited by examiner

SOUND BAR AND PERCUSSION INSTRUMENT

CROSS-REFERENCE TO RELATED APPLICATIONS

This is a continuation of International Application No. PCT/JP2022/013719 filed on Mar. 23, 2022, and claims priority from Japanese Patent Application No. 2021-063501 filed on Apr. 2, 2021, the entire content of which is incorporated herein by reference.

TECHNICAL FIELD

The present disclosure relates to a sound bar and a percussion instrument.

BACKGROUND ART

A percussion instrument, such as a marimba or a xylophone, includes a plurality of sound bars as sounding bodies. The sound bar produces a sound by being struck by a mallet. As a material for the sound bar, for example, a wood material such as rosewood, *Betula* schmidtii, padauk, and Chinese quince is used. In order to obtain an excellent sound quality and durability against striking in the sound bar, a laminate of a wood material and a fiber reinforced plastic sheet is also proposed (see JP2003-084759A).

SUMMARY

As described in JP2003-084759A, a sound bar is formed by laminating a plurality of functional layers intended to enhance a specific function such as a sound quality or a strength. An overall size of the sound bar is controlled based on the quality of each functional layer so as to produce a sound in a desired pitch range.

With respect to this, the present inventors have intensively studied to obtain a new finding of improving a degree of freedom in designing a sound bar while paying attention to problems of a sound bar.

The present disclosure is made in view of the above-described circumstance, and an object thereof is to improve the degree of freedom in designing a sound bar.

A sound bar according to an aspect of the present disclosure includes: an elongated member having a striking surface having an elongated shape, in which a weight of a striking surface side area of the elongated member, per unit volume of the striking surface side area of the elongated member, changes along a longitudinal direction of the striking surface, the striking surface side area being defined in a range of a uniform thickness from the striking surface.

The elongated member is made of a first material, the elongated member is impregnated with a second material from the striking surface in a thickness direction of the elongated member, the second material being a different material than the first material, and an impregnation amount of the second material changes along the longitudinal direction of the striking surface.

An impregnation depth of the second material monotonically increases or monotonically decreases from a central area of the elongated member in the longitudinal direction of the striking surface toward both sides of the elongated member in the longitudinal direction of the striking surface.

In the striking surface side area, a density of the second material monotonically increases or monotonically decreases from a central area of the elongated member in the longitudinal direction of the striking surface toward both sides of the elongated member in the longitudinal direction of the striking surface.

The elongated member includes: a surface layer having the striking surface and a fixing surface opposite across a thickness of the surface layer from the striking surface; and a base fixed to the fixing surface of the surface layer, a specific gravity of the surface layer is different from a specific gravity of the base, and a thickness of the surface layer changes along the longitudinal direction of the striking surface.

The base is made of a wood material.

The base includes a plurality of laminated plates, and a lamination direction of the plurality of laminated plates is perpendicular to a thickness direction of the base.

The surface layer contains oriented fibers.

The elongated member further includes an intermediate layer arranged between the surface layer and the base, the intermediate layer contains oriented fibers, and a fiber direction of the oriented fibers of the intermediate layer is perpendicular to a fiber direction of the oriented fibers of the surface layer in a plan view.

The thickness of the surface layer may monotonically increase or monotonically decrease from a central area of the elongated member in the longitudinal direction of the striking surface toward both sides of the elongated member in the longitudinal direction of the striking surface.

A percussion instrument according to an aspect of the present disclosure includes a plurality of the sound bars, in which at least two sound bars of the plurality of sound bars are different in a weight increase/decrease direction along the longitudinal direction of the striking surface in the striking surface side area from each other, or layer structures of the at least two sound bars are different from each other. Further, the layer structures of the at least two sound bars are different from each other in a weight of both ends of the elongated member in the longitudinal direction of the striking surface or different from each other in a thickness of the elongated member in a central area of the elongated member in the longitudinal direction of the striking surface.

A material of an outermost layer on a striking surface side of all sound bars of the plurality of sound bars is the same for all sound bars of the plurality of sound bars.

In the present disclosure, the sentence, "the weight of the striking surface side area changes along the longitudinal direction of the striking surface", means that the weight of the striking surface side area changes relatively along the longitudinal direction of the striking surface, and the sentence includes a configuration in which the weight of the striking surface side area changes in a stepwise manner in addition to a configuration in which the weight of the striking surface side area changes continuously (smoothly). The sentence, "the fiber direction of the intermediate layer is perpendicular to the fiber direction of the surface layer in a plan view", means that a direction along the fiber of the intermediate layer (for example, a direction along a pith of a wood material in a case in which the intermediate layer contains the wood material) and a direction along the fiber of the surface layer are substantially perpendicular to each other in a plan view, and the present disclosure is not limited to a configuration in which the fiber direction of the intermediate layer and the fiber direction of the surface layer are strictly perpendicular to each other.

In the sound bar according to one aspect of the present disclosure, the weight of the striking surface side area defined in a range of a uniform thickness from the striking surface changes along the longitudinal direction of the striking surface, and thus it is possible to improve a degree of freedom in designing the sound quality, the strength, an overall thickness, and the like of the sound bar.

BRIEF DESCRIPTION OF DRAWINGS

The present disclosure will be described in detail based on the following figures, wherein.

DESCRIPTION OF EMBODIMENTS

Hereinafter, embodiments of the present disclosure will be described in detail with reference to the drawings as appropriate. The described upper limit value and lower limit value may be optionally combined for numerical values described in the present specification. In the present specification, it is assumed that a numerical range from an upper limit value to a lower limit value that can be combined is set as a suitable range.

First Embodiment

<Sound Bar>

Figure 1:
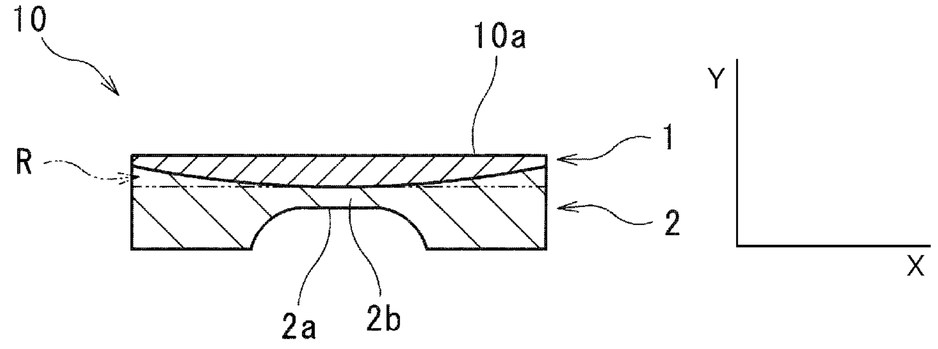
FIG. 1 is a schematic cross-sectional view taken along a cutting surface parallel to a side surface of a sound bar according to an embodiment of the present disclosure.
Figure 2:
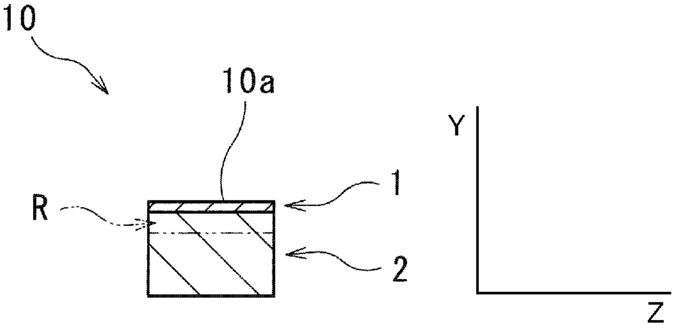
FIG. 2 is a schematic cross-sectional view taken along a cutting surface perpendicular to the side surface of the sound bar illustrated in FIG. 1.

A sound bar 10 illustrated in FIGS. 1 and 2 includes an elongated striking surface 10*a*. In the sound bar 10, a weight of a striking surface side area R defined in a range of a uniform thickness from the striking surface 10*a* changes along a longitudinal direction of the striking surface 10*a*. In other words, in the sound bar 10, the weight of the area (the striking surface side area R) increases or decreases along the longitudinal direction of the striking surface 10*a*. The striking surface side area R is sandwiched between the striking surface 10*a* and a virtual surface provided at a constant depth from the striking surface 10*a* and parallel to the striking surface 10*a*. The "striking surface side area defined in the range of the uniform thickness from the striking surface" means an area having a uniform depth from the striking surface of the sound bar 10 in a normal direction. Here, the "striking surface" means a main surface that produces a sound by being struck, and is made of a flat surface, a curved surface, or the like.

The sound bar 10 is used for a percussion instrument such as a marimba, a xylophone, or a vibraphone. In general, the percussion instrument includes a plurality of elongated sound bars. The sound bar has a striking surface to be struck by a mallet, and is provided with a recessed portion on a surface opposite to the striking surface. In general, a sound bar for a high-pitch range has a length in a longitudinal direction smaller than that of a sound bar for a low-pitch range, and has a large overall thickness. The sound bar 10 illustrated in FIG. 1 is not particularly limited, and can be used as, for example, a sound bar for a high-pitch range.

The sound bar 10 is an elongated member, and includes a surface layer 1 having the striking surface 10*a* and a base 2 directly or indirectly laminated on a surface (serving as an example of a fixing surface) of the surface layer 1 opposite to the striking surface 10*a*. As described above, the sound bar 10 includes the striking surface side area R of which the weight changes along the longitudinal direction of the striking surface 10*a*. In the sound bar 10, the striking surface side area R may be an area sandwiched between the striking surface 10*a* and a virtual surface, which is indicated by the dot-dash line of FIG. 1, that passes through a portion where a thickness of the surface layer 1 is maximum and that is parallel to the striking surface 10*a*.

In the sound bar 10, the surface layer 1 is laminated on the base 2. The sound bar 10 may include a layer other than the surface layer 1 and the base 2, or may not include a layer other than the surface layer 1 and the base 2. The surface layer 1 and the base 2 are fixed by using, for example, an adhesive.

The surface layer 1 and the base 2 have different specific gravities. The thickness of the surface layer 1 changes along the longitudinal direction of the striking surface 10*a*. With such a configuration, the weight of the striking surface side area R along the longitudinal direction of the striking surface 10*a* can be easily changed in the sound bar 10.

(Surface Layer)

The surface layer 1 has a thin plate shape. The striking surface 10*a* is an outermost surface of the sound bar 10 which is to be struck by a mallet. The striking surface 10*a* is elongated, and has a rectangular shape in a plan view in more detail.

A material for the surface layer 1 is not particularly limited, and examples thereof include wood materials, resins, fiber reinforced plastics (FRP), paper, metals, ceramics, elastomers, etc. The material for the surface layer 1 can be selected based on the sound quality or the like required for the sound bar 10. As the material for the surface layer 1, for example, a material containing oriented fibers is preferably used. Examples of the material containing oriented fibers include wood materials, fiber reinforced plastics, paper, etc. When the sound bar 10 is intended to produce a woody sound, a wood material is used as the material for the surface layer 1.

The surface layer 1 may be provided as a functional layer that has a function of improving a strength of the sound bar 10. In this case, for example, the specific gravity of the surface layer 1 is larger than the specific gravity of the base 2.

In the case in which the material for the surface layer 1 is a wood material, examples of the wood material include rosewood, padauk, Chinese quince, maple, hard maple, hornbeam, beech, oak, matowa, mahogany, birch, etc.

Figure 3:
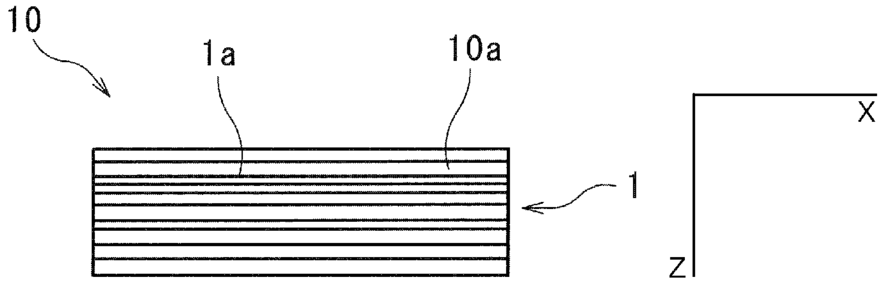
FIG. 3 is a schematic plan view of the sound bar illustrated in FIG. 1.

In the case in which the material for the surface layer 1 is a wood material, the wood material may be, for example, a cross-grained plate. For example, as illustrated in FIG. 3, the wood material is a straight-grained plate. Since the wood material is a straight-grained plate, an outer appearance of the sound bar 10 can be improved. From a viewpoint of improving the appearance of the sound bar 10, a wood grain 1*a* of the wood material is along the longitudinal direction of the striking surface 10*a*. Here, the "straight-grained plate" refers to a sound bar material which is obtained by sawing the wood such that an average angle of an annual ring with respect to a vertical direction (a thickness direction of the surface layer) falls within a range of ±45° as viewed from a cut end (a cross section in which annual rings are viewed concentrically).

As illustrated in FIG. 1, the thickness of the surface layer 1 monotonically decreases from a central area in the longitudinal direction of the striking surface 10*a* toward both sides in the longitudinal direction. According to this configuration, the strength, the weight, and the like of the sound bar 10 can be changed from the central area in the longitudinal direction of the striking surface 10*a* toward both sides in the longitudinal direction in accordance with the thickness of the surface layer 1. For example, in a case in which the sound bar 10 is used as a sound bar for a high-pitch range, the sound quality and strength of the sound bar 10, the overall thickness of the sound bar 10, and the like are easily adjusted by making the weight of both side areas in the longitudinal direction of the striking surface 10*a* smaller than that in the central area.

A difference between a maximum thickness and a minimum thickness of the surface layer 1 (the difference between the maximum thickness and the minimum thickness with respect to a flat surface of the striking surface 10*a*) is not particularly limited and can be set within a range in which a degree of freedom in designing the sound bar 10 is improved. A lower limit of the difference may be, for example, 0.10 mm or 0.20 mm. Meanwhile, an upper limit of the difference may be, for example, 4 mm or 2 mm.

The surface layer may be impregnated with a dissimilar material (serving as an example of a second material different than a first material of which the sound bar 10 is made) in the thickness direction from the striking surface 10*a*. A configuration in which a dissimilar material is impregnated will be described with reference to FIG. 4. A surface layer 11 illustrated in FIG. 4 can be used in place of the surface layer 1 illustrated in FIG. 1.

Figure 4:
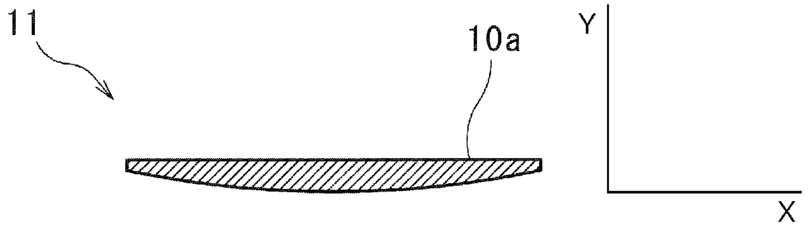
FIG. 4 is a schematic cross-sectional view illustrating an example of a surface layer of the sound bar illustrated in FIG. 1 and corresponding to FIG. 1.

The surface layer 11 illustrated in FIG. 4 includes a base material and the dissimilar material with which the base material is impregnated. As the base material, a material such as a porous material allowed to be impregnated with a dissimilar material is used. The base material is not particularly limited, and examples thereof include a wood material. According to this configuration, the sound bar 10 can easily produce a woody sound. The surface layer 11 is impregnated with the dissimilar material, and thus a strength of the surface layer 11 can be easily improved. A specific type and configuration of the wood material constituting the base material may be the same as those of the surface layer 1 illustrated in FIG. 1.

The dissimilar material preferably has a specific gravity larger than that of the base material. Examples of the dissimilar material include a resin. The resin is not particularly limited, and a thermosetting resin, which has a low viscosity and with which the base material is easily impregnated, may be used. Examples of the thermosetting resin include an epoxy resin, a phenol resin, a urea resin, a polyester, an acrylic resin, a silicate resin, a melamine resin, polyurethane, etc.

The dissimilar material may contain a filler (fine particles). Examples of the filler include talc, a glass fiber, etc. When the dissimilar material contains the filler, the strength of the surface layer 11 can be further improved.

An impregnation amount of the dissimilar material changes along the longitudinal direction of the striking surface 10*a*. According to this configuration, the weight of the striking surface side area R can be easily changed along the longitudinal direction of the striking surface 10*a*.

With the dissimilar material, for example, an entire area of the surface layer 11 is impregnated. According to this configuration, an impregnation depth of the dissimilar material can be controlled by the thickness of the surface layer 11. That is, the impregnation depth of the dissimilar material can be caused to match with the thickness of the surface layer 11. As a result, it is easy to selectively arrange the dissimilar material in a desired range on a striking surface 10*a* side, and it is easy to improve the degree of freedom in designing the sound bar 10. According to this configuration, a specific gravity of the surface layer 11 can be easily made larger than the specific gravity of the base 2.

The impregnation depth of the dissimilar material monotonically increases or monotonically decreases from the central area in the longitudinal direction of the striking surface 10*a* toward both sides in the longitudinal direction, for example. In the sound bar 10, it is easy to monotonously increase or monotonously decrease the impregnation depth of the dissimilar material from the central area in the longitudinal direction of the striking surface 10*a* toward both sides in the longitudinal direction in accordance with the thickness of the surface layer 11 by impregnating the entire area of the surface layer 11 with the dissimilar material. For example, in the case in which the sound bar 10 is used as a sound bar for a high-pitch range, the sound quality and strength of the sound bar 10, the overall thickness of the sound bar 10, and the like can be easily adjusted by making the impregnation depth of the dissimilar material in the both side areas in the longitudinal direction of the striking surface 10*a* smaller than that in the central area. A density of the dissimilar material monotonically increases or monotonically decreases from the central area in the longitudinal direction of the striking surface 10*a* toward both sides in the longitudinal direction when viewed in the longitudinal direction of the striking surface 10*a* at a uniform thickness at which the impregnation depth of the dissimilar material is largest in the thickness direction of the sound bar 10.

In the striking surface side area R, the density of the dissimilar material may monotonically increase or monotonically decrease from the central area in the longitudinal direction of the striking surface 10*a* toward both sides in the longitudinal direction. In the sound bar 10, it is easy to monotonously increase or monotonously decrease the density of the dissimilar material in the striking surface side area R from the central area in the longitudinal direction of the striking surface 10*a* toward both sides in the longitudinal direction in accordance with the thickness of the surface layer 11 by impregnating the entire area of the surface layer 11 with the dissimilar material. For example, in the case in which the sound bar 10 is used as a sound bar for a high-pitch range, the sound quality and strength of the sound bar 10, the overall thickness of the sound bar 10, and the like can be easily adjusted by making the density of the dissimilar material in the both side areas in the longitudinal direction of the striking surface 10*a* smaller than that in the central area.

(Base)

The base 2 supports the surface layer 1 from a back surface side of the surface layer 1. The base 2 controls the sound quality to be produced by the sound bar 10. As illustrated in FIG. 1, a recessed portion 2*a* is provided on a back surface of the base 2. The recessed portion 2*a* is formed in a central portion in a longitudinal direction of the base 2. The recessed portion 2*a* laterally crosses the back surface of the base 2. The base 2 includes a thin portion 2*b* recessed by the recessed portion 2*a*. The recessed portion 2*a* is provided on the back surface of the base 2, and thus the sound bar 10 is tuned such that a ratio of the number of vibrations in each mode of a fundamental mode and a higher-order mode is substantially an integral multiple.

A material for the base 2 is not particularly limited, and for example, the materials exemplified for the surface layer 1 may be used. As will be described later, the base 2 may be formed by using, for example, a plurality of plate materials made of the materials exemplified for the surface layer 1. In this case, for example, the materials for all the plate materials constituting the base 2 are the same.

The base 2 is made of, for example, a wood material. Examples of the wood material constituting the base 2 include the wood materials exemplified for the surface layer 1. The base 2 is made of a wood material, and thus the sound bar 10 can easily produce a woody sound. The base 2 may be impregnated with the above dissimilar material. In the case in which the base 2 includes the plurality of plate materials, only some of the plurality of plate materials may be impregnated with the dissimilar material. When both the surface layer 1 and the base 2 contain the wood material and the surface layer 1 is not impregnated with the dissimilar material, in order to make the specific gravity of the surface layer 1 different from the specific gravity of the base 2, the type of the wood material to be used for the base 2 may be different from the type of the wood material used for the surface layer 1.

Figure 5:
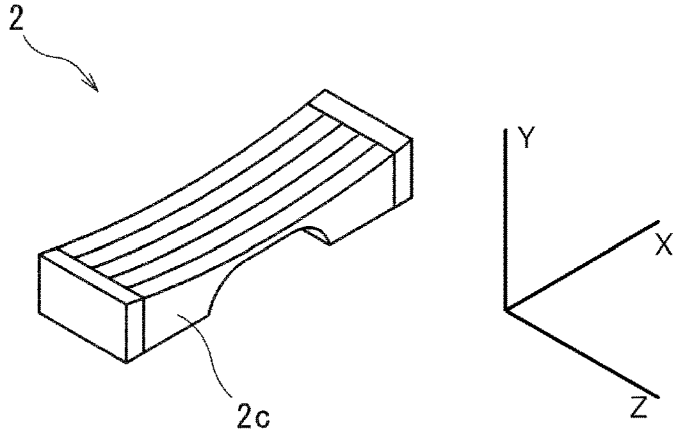
FIG. 5 is a schematic perspective view illustrating an example of a base of the sound bar illustrated in FIG. 1.

The base 2 may be formed with a single plate material. On the other hand, the base 2 may be a laminated body in which a plurality of plate materials are laminated. In this case, the base 2 may be formed by fixing the plurality of plate materials with an adhesive. FIG. 5 is a schematic perspective view illustrating an example of the base of the sound bar illustrated in FIG. 1. An X-Y-Z axis illustrated in FIG. 5 indicates the longitudinal direction of the base 2, a thickness direction of the base 2, and a width direction of the base 2 in an X-axis direction, a Y-axis direction, and a Z-axis direction, respectively. The X-Y-Z axis is similarly applied to drawings of other embodiments. However, a sound bar 60 according to another embodiment is tubular, a thickness direction of a base is not defined in the Y-axis direction, and a width direction of the base is not defined in the Z-axis direction. The base 2 may be formed by laminating a plurality of plate materials in the thickness direction of the base 2 (the Y-axis direction illustrated in FIG. 5). Meanwhile, for example, as illustrated in FIG. 5, in the base 2, a lamination direction of a plurality of plate materials 2*c* (the Z direction illustrated in FIG. 5) may be perpendicular to the thickness direction of the base 2 (the Y-axis direction illustrated in FIG. 5). In other words, the base 2 may be provided by laminating the plurality of plate materials 2*c* in a plane direction (for example, the X-axis direction or the Z-axis direction illustrated in FIG. 5) perpendicular to the thickness direction of the base 2 (the Y direction illustrated in FIG. 5). According to this configuration, the adhesive for bonding the plurality of plate materials 2*c* is not arranged in a film shape in the plane direction (the X-Z plane direction illustrated in FIG. 5). As a result, it is possible to prevent attenuation of vibration in the plane direction caused by the adhesive, and to easily produce a sound with an elongation.

<Manufacturing Method>

Next, an example of a method for manufacturing the sound bar 10 will be described. The method for manufacturing the sound bar includes a step of forming the surface layer (a forming step), and a step of laminating the surface layer formed in the forming step and the base (a laminating step).

(Forming Step)

In the forming step, the surface layer 1 or the surface layer 11 including, for example, the flat striking surface 10*a* and a curved surface facing the striking surface 10*a* are formed. In the forming step, for example, after the entire surface layer is curved in an arch shape (an arched shape), a desired shape can be formed by subjecting one curved surface to a flattening treatment such as cutting. The forming step may be performed before the laminating step or after the laminating step.

A procedure for impregnating the surface layer with the dissimilar material in the forming step will be described. When impregnating the entire area of the surface layer with the dissimilar material, in the forming step, after the base material constituting the surface layer is immersed in a solution containing the dissimilar material, the dissimilar material is cured by heating or the like.

In the forming step, for example, the base material and the solution are put in a chamber, and the inside of the chamber is depressurized, and then the base material is immersed in the solution. In the forming step, for example, the inside of the chamber is pressurized to an atmospheric pressure or higher in a state in which the base material is immersed in the solution. By depressurizing the inside of the chamber in the forming step, air present in the base material can be removed, and the dissimilar material can be easily introduced into voids in the base material. Further, by pressurizing the inside of the chamber in a state in which the base material is immersed in the solution, the dissimilar material can be easily pushed into the base material. According to this procedure, the base material can easily be impregnated with the dissimilar material evenly up to the inside of the base material, and the base material can be impregnated with the dissimilar material over the entire area of the base material. As a result, the impregnation depth of the dissimilar material in the sound bar 10 can be easily controlled. In the forming step, the procedure may be repeated twice or more.

In the method for manufacturing the sound bar, only a part of the surface layer may be impregnated with the dissimilar material. In this case, in the forming step, only a desired thickness range from the striking surface side of the base material may be immersed in the solution.

(Laminating Step)

In the laminating step, the surface layer formed in the forming step and the base separately prepared are fixed with an adhesive.

<Advantages>

There are various problems relating to a sound bar depending on a musical instrument or depending on a pitch or the like in one musical instrument. For example, in a marimba or a xylophone, there is a unique problem relating to a sound bar depending on a pitch. Specific examples include the following. In mainly a sound bar for a high-pitch range, there is a problem that a central area in a longitudinal direction of the sound bar, which is to be frequently struck, is likely to be dented by striking due to use of a hard mallet. On the other hand, when a wood material is impregnated with a resin (hereinafter, the wood material impregnated with the resin is also referred to as a "resin-impregnated wood material"), hardness of the resin-impregnated wood material is larger than that of the wood material of the same material. Therefore, an advantage of using the resin-impregnated wood material in the sound bar is that hardness of a front surface is effectively increased by using the resin-impregnated wood material as a material including the front surface. In contrast, a disadvantage of using the resin-impregnated wood material in the sound bar is that, since the contained resin results in a sound quality different from that originally derived from the wood material, as the content of the resin-impregnated wood material increases with respect to the entire sound bar, the sound quality deviates from a sound quality of a marimba or a xylophone.

The resin-impregnated wood material has a specific gravity larger than that of the normal wood material of the same material. In general, the specific gravity and hardness has positive correlation with each other, and hardness and elastic modulus has positive correlation with each other. As the material hardness of the wood material becomes larger and the thickness of the wood material becomes larger, a resistance to occurrence of the dent becomes larger. When the elastic modulus increases, the pitch of the sound to be produced increases. On the other hand, when the resin-impregnated wood material is thick, the specific gravity is large. Consequently, the weight on both end sides increases and the pitch decreases, and trimming allowance for tuning is reduced.

It is necessary to tune a pitch in a sound bar after a bar body is molded. The tuning is performed by grinding a central portion of a back surface of the sound bar or both end portions of the sound bar in the longitudinal direction. That is, the pitch is decreased by lowering rigidity by grinding of the central area of the sound bar, and the pitch is increased by decreasing the mass of both end portions. Since the trimming of the sound bar is achieved by reducing the thickness of the sound bar, the strength is lowered where the thickness is reduced. Therefore, the trimming is required to be adjusted within a range of a normal life of a sound bar (a range in which the wood material is not cracked) and within a range in which a dent of the striking surface due to musical performance does not occur. On the other hand, during the tuning, in a case in which a resin-impregnated layer and/or a resin layer are present on a surface layer side, even when the wood material is shaved by grinding of both end portions of the sound bar, until the grinding reaches the resin-impregnated layer and/or the resin layer, the resin-impregnated layer and/or the resin layer having high rigidity remain as they are in the central area where the surface layer is thick and in the both ends where the surface layer is thin. Consequently, fine adjustment of the pitch can be easily performed. Further, even when the trimming is performed, the strength of the sound bar can be maintained, and the striking surface is less likely to be dented. Further, a limit of trimming is increased, and an adjustment range is widened as compared with a related art.

Environmental protection is emphasized, and thus a natural wood material is rare and difficult to obtain, or expensive, but there are cases in which sound bars are made of such materials. When the sound bar is made of such a material, there is a background in which wood materials each having a wood grain suitable for a sound bar are strictly selected, and a large single plate is very difficult to obtain from such strictly selected wood materials. However, by using a material having a rigidity higher than that of a wood material, such as a material to be the resin-impregnated wood material or the resin material, for only an appropriate portion of a sound bar, an overall size of the sound bar can be made smaller as compared with the related art even when forming a sound bar having the same pitch, and a small material, which cannot be used in the related art, can be used as a sound bar. That is, it is possible to enjoy music by using a sound bar by effectively using a rare wood material while reducing waste of the rare wood material and contributing to society. By using the resin-impregnated wood material or the resin material at an appropriate portion, the use of a rare wood material is minimum, and the above disadvantage is prevented.

The sound bar 10 according to the present embodiment can easily take the advantages and the like of the material when attention is paid to such problems of a sound bar. In the sound bar 10, the weight of the striking surface side area R defined in a range of a uniform thickness from the striking surface 10*a* changes along the longitudinal direction of the striking surface 10*a*. Consequently, it is possible to: improve the degree of freedom in designing the sound quality, the strength, the overall thickness, and the like of the sound bar 10; to improve the easiness of fine adjustment in tuning; and to widen the adjustment range.

In the sound bar 10 according to the present embodiment, the thickness of the resin-impregnated wood material is larger in the central area in the longitudinal direction, which is to be frequently struck, as compared with the both end sides. Consequently, the resistance to occurrence of the dent can be improved, and the elastic modulus can be improved. Further, the pitch can be improved, and the trimming allowance for tuning can be increased. In the sound bar 10, the weight of the striking surface side area R per predetermined volume is monotonously decreased from the central area of the striking surface 10*a* in the longitudinal direction toward both sides in the longitudinal direction. Consequently, the weight of both end sides in the longitudinal direction of the striking surface 10*a* can be reduced. Therefore, the sound bar 10 can be suitably used as a sound bar for a high-pitch range.

Second Embodiment

<Sound Bar>

Figure 6:
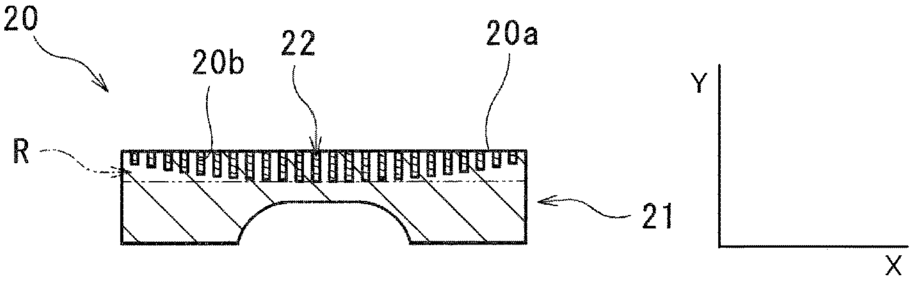
FIG. 6 is a schematic cross-sectional view illustrating a sound bar according to an embodiment different from the sound bar illustrated in FIG. 1 and corresponding to FIG. 1.

A sound bar 20 illustrated in FIG. 6 includes an elongated striking surface 20*a*. In the sound bar 20, a weight of the striking surface side area R defined in a range of a uniform thickness from the striking surface 20*a* changes along a longitudinal direction of the striking surface 20*a*. The sound bar 20 can be used in place of the sound bar 10 illustrated in FIG. 1. A thickness of the sound bar 20 may be substantially the same as a total thickness of the surface layer 1 and the base 2 illustrated in FIG. 1.

The sound bar 20 includes a base material 21 having the striking surface 20*a*. The base material 21 is impregnated with a dissimilar material 22 in a thickness direction from the striking surface 20*a*.

An impregnation amount of the dissimilar material 22 changes along the longitudinal direction of the striking surface 20*a*. In the sound bar 20, the impregnation amount of the dissimilar material 22 changes, and thus the weight of the striking surface side area R changes along the longitudinal direction of the striking surface 20*a*.

(Base Material)

As the base material 21, a material such as a porous material that is allowed to be impregnated with the dissimilar material 22 is used. The base material 21 is not particularly limited, and examples thereof include a wood material. Examples of the wood material used as the base material 21 include the wood materials exemplified for the surface layer 1 illustrated in FIG. 1.

The striking surface 20*a* is provided with a plurality of fine holes 20*b*. The plurality of fine holes 20*b* may be formed by, for example, laser incising processing, a method of sticking a needle, or a method of blowing a fluid. A depth of the plurality of fine holes 20*b* monotonically decreases from a central area in the longitudinal direction of the striking surface 20*a* toward both sides in the longitudinal direction. The plurality of fine holes 20*b* are arranged at substantially equal intervals along the longitudinal direction of the striking surface 20*a*. In the sound bar 20, the striking surface side area R may be an area sandwiched between the striking surface 20*a* and a virtual surface, which is indicated by the dot-dash line of FIG. 6, that passes through a deepest portion of the plurality of fine holes 20*b* and that is parallel to the striking surface 20*a*.

(Dissimilar Material)

The dissimilar material 22 is filled in the plurality of fine holes 20*b*. That is, the arrangement and content of the dissimilar material 22 are adjusted according to the arrangement, size, and the like of the plurality of fine holes 20*b*. Examples of a material used for the dissimilar material 22 include the materials exemplified for the sound bar 10 illustrated in FIG. 1. As long as an overall content of the dissimilar material 22 is adjusted by the plurality of fine holes 20*b*, a portion other than the plurality of fine holes 20*b* may be impregnated with the dissimilar material 22.

An impregnation depth of the dissimilar material 22 monotonically decreases from the central area in the longitudinal direction of the striking surface 20*a* toward both sides in the longitudinal direction. More specifically, the impregnation depth of the dissimilar material 22 decreases in a stepwise manner from the central area in the longitudinal direction of the striking surface 20*a* toward both sides in the longitudinal direction in accordance with the depth of the plurality of fine holes 20*b*.

In the striking surface side area R, for example, a density of the dissimilar material 22 may monotonically decrease from the central area in the longitudinal direction of the striking surface 20*a* toward both sides in the longitudinal direction. More specifically, the density of the dissimilar material 22 in the striking surface side area R decreases in a stepwise manner from the central area in the longitudinal direction of the striking surface 20*a* toward both sides in the longitudinal direction in accordance with the depth of the plurality of fine holes 20*b*.

<Advantages>

In the sound bar 20, the weight of the striking surface side area R defined in a range of a uniform thickness from the striking surface 20*a* changes along the longitudinal direction of the striking surface 20*a*. Consequently, it is possible to improve a degree of freedom in designing the sound quality, the strength, an overall thickness, and the like of the sound bar 20.

Third Embodiment

<Sound Bar>

Figure 7:
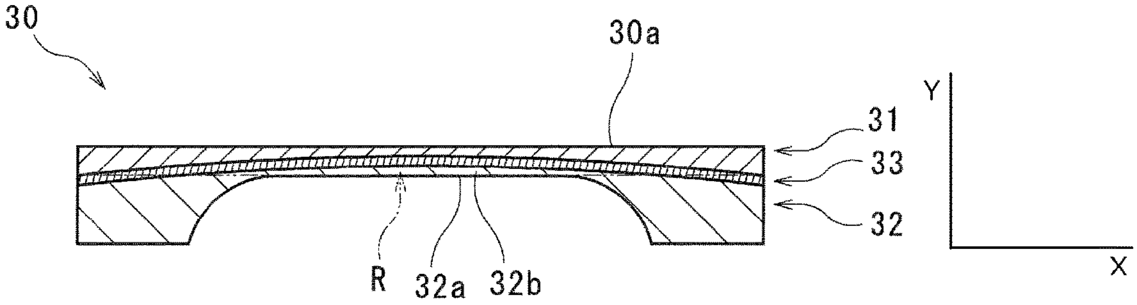
FIG. 7 is a schematic cross-sectional view illustrating a sound bar according to an embodiment different from the sound bars illustrated in FIGS. 1 and 6 and corresponding to FIG. 1.
Figure 8:
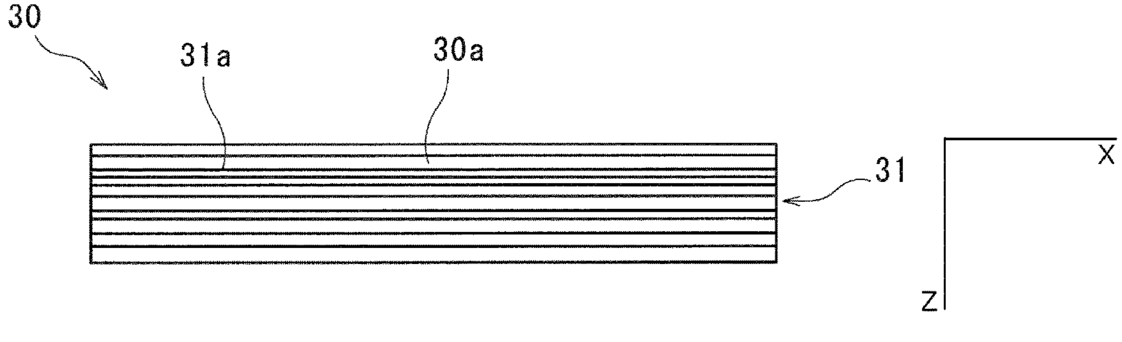
FIG. 8 is a schematic plan view of the sound bar illustrated in FIG. 7.
Figure 9:
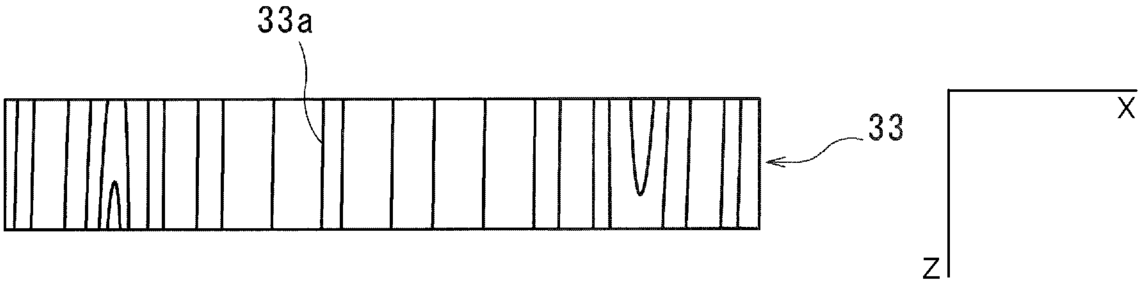
FIG. 9 is a schematic view illustrating a front surface on a striking surface side of an intermediate layer of the sound bar illustrated in FIG. 7.

A sound bar 30 illustrated in FIGS. 7 to 9 includes an elongated striking surface 30*a*. In the sound bar 30, a weight of the striking surface side area R defined in a range of a uniform thickness from the striking surface 30*a* changes along a longitudinal direction of the striking surface 30*a*. The sound bar 30 includes a surface layer 31 having the striking surface 30*a* and a base 32 indirectly laminated on a surface (serving as an example of a fixing surface) of the surface layer 31 opposite to the striking surface 30*a*. The sound bar 30 includes an intermediate layer 33 arranged between the surface layer 31 and the base 32.

The surface layer 31, the intermediate layer 33, and the base 32 are fixed by using, for example, an adhesive. The surface layer 31, the intermediate layer 33, and the base 32 are arranged in this order from the striking surface 30*a* side toward a back surface side. The sound bar 30 may include a layer other than the surface layer 31, the intermediate layer 33, and the base 32, or may not include a layer other than the surface layer 31, the intermediate layer 33, and the base 32. The sound bar 30 is not particularly limited, and can be used as, for example, a sound bar for a low-pitch range.

(Surface Layer)

The surface layer 31 contains oriented fibers. The surface layer 31 contains, for example, a wood material as a material containing oriented fibers. A thickness of the surface layer 31 monotonically increases from a central area in the longitudinal direction of the striking surface 30*a* toward both sides in the longitudinal direction. A length of the surface layer 31 in the longitudinal direction is larger than that of the surface layer 1 illustrated in FIG. 1. A specific configuration of the surface layer 31 may be the same as the surface layer 1 illustrated in FIG. 1 or the surface layer 11 illustrated in FIG. 4, except that the thickness increase/decrease direction and the longitudinal direction length are different. In the sound bar 30, the striking surface side area R may be an area sandwiched between the striking surface 30*a* and a virtual surface, which is indicated by the dot-dash line of FIG. 7, that passes through a portion where the thickness of the surface layer 31 is maximum and that is parallel to the striking surface 30*a*.

(Base)

The base 32 supports the surface layer 31 and the intermediate layer 33 from a back surface side. The base 32 controls a sound quality to be produced by the sound bar 30.

A recessed portion 32*a* is provided on a back surface of the base 32. The recessed portion 32*a* is formed in a central portion in a longitudinal direction of the base 32. The recessed portion 32*a* laterally crosses the back surface of the base 32. The base 32 includes a thin portion 32*b* recessed by the recessed portion 32*a*. A thickness of the thin portion 32*b* of the base 32 is smaller than a thickness of the thin portion 2*b* of the base 2 illustrated in FIG. 1. A length of the base 32 in the longitudinal direction is larger than the length of the base 2 in the longitudinal direction illustrated in FIG. 1. The base 32 may have the same configuration as the base 2 illustrated in FIG. 1, except that the thickness of the thin portion 32*b* is small and the length in the longitudinal direction is large.

(Intermediate Layer)

The intermediate layer 33 contains oriented fibers. The intermediate layer 33 contains, for example, a wood material as a material containing oriented fibers. More specifically, the intermediate layer 33 is made of a wood material. In the sound bar 30, the intermediate layer 33 contains a wood material, and thus main body of each of the surface layer 31, the intermediate layer 33, and the base 32 may be made of a wood material. Examples of the wood material contained in the intermediate layer 33 include the wood materials exemplified for the surface layer 1 illustrated in FIG. 1.

When the thickness of the thin portion 32*b* of the base 32 is small, the sound bar 30 is likely to be cracked. The intermediate layer 33 is mainly provided to prevent the cracking. The intermediate layer 33 may be formed by laminating a plurality of single plates in a thickness direction, or may be formed with one single plate.

A fiber direction of the intermediate layer 33 is, for example, perpendicular to a fiber direction of the surface layer 31 in a plan view. More specifically, as illustrated in FIGS. 8 and 9, the wood material of the intermediate layer 33 is arranged such that a wood grain 33*a* thereof extends perpendicular to a wood grain 31*a* of the wood material of the surface layer 31 in a plan view. According to this configuration, the cracking of the sound bar 30 can be more reliably prevented. By arranging the wood material of the intermediate layer 33 such that the wood grain 33*a* extends perpendicular to the wood grain 31*a* of the wood material of the surface layer 31 in a plan view, the wood grain 33*a* of the wood material of the intermediate layer 33 can easily cross a crack development direction. Therefore, for example, even when a wood material having a relatively small specific gravity is used for the intermediate layer 33, the cracking of the sound bar 30 can be easily prevented. As a result, a degree of freedom in the thickness of the intermediate layer 33 and a degree of freedom in selecting the type of wood material are improved, and the sound quality of the sound bar 30 can be easily improved.

<Manufacturing Method>

A method for manufacturing the sound bar 30 includes, for example, a step of forming the surface layer 31 (a forming step), and a step of laminating the surface layer 31 formed in the forming step, the intermediate layer 33, and the base 32 in this order (a laminating step).

The forming step can be performed in the same procedure as the forming step in the method for manufacturing the sound bar 10 illustrated in FIG. 1. In the laminating step, for example, the surface layer 31, the intermediate layer 33, and the base 32 are fixed with an adhesive.

<Advantages>

There are various problems relating to a sound bar depending on a musical instrument or depending on a pitch or the like in one musical instrument. For example, in a marimba or a xylophone, there is a unique problem relating to a sound bar depending on a pitch. Specific examples include the following. In mainly a sound bar for a low-pitch range, there is a demand for increase of the mass of both end areas in a longitudinal direction of the sound bar. As the mass of the both end areas increases, a thinning amount of the central area (a thinning amount of the recessed portion 32*a*) can be reduced. Accordingly, the thickness of the central area is increased and durability is improved. A resin-impregnated wood material has a specific gravity larger than that of a normal wood material of the same material, and thus can effectively increase the mass. A disadvantage is that, since the contained resin results in a sound quality different from that originally derived from the wood material, as the content of the resin-impregnated wood material increases with respect to the entire sound bar, the sound quality deviates from a sound quality of a marimba or a xylophone.

As described in the first embodiment, it is necessary to tune a pitch in a sound bar after a bar body is molded. Further, environmental protection is emphasized, and thus a natural wood material is rare and difficult to obtain, or expensive.

The sound bar 30 according to the present embodiment can easily take the advantages and the like of the material when attention is paid to such problems of a sound bar. In the sound bar 30, the thickness of the surface layer 31 monotonically increases from the central area in the longitudinal direction of the striking surface 30*a* toward both sides in the longitudinal direction. According to this configuration, the strength, the weight, and the like of the sound bar 30 can be changed from the central area in the longitudinal direction of the striking surface 30*a* toward both sides in the longitudinal direction in accordance with the thickness of the surface layer 31. For example, in a case in which the sound bar 30 is used as a sound bar for a low-pitch range, by making the weight of both side areas in the longitudinal direction of the striking surface 30*a* larger that of the central area, it is possible: to improve the degree of freedom in designing the sound quality, the strength, the overall thickness, and the like of the sound bar 30; to improve the easiness of fine adjustment in tuning; and to widen an adjustment range. When using a rare wood material, the rare wood material can be effectively used.

In general, the sound bar tends to produce a sound in a low-pitch range by increasing flexibility of the central area in the longitudinal direction. In the related art, in order to increase the flexibility of the central area in the longitudinal direction, the depth of the recessed portion provided on the back surface of the base is increased. In contrast, in the sound bar 30, by monotonically increasing the weight of the striking surface side area R from the central area of the striking surface 30*a* in the longitudinal direction toward both sides in the longitudinal direction, the strength of the central area in the longitudinal direction can be relatively decreased, and the flexibility of the central area can be improved. Therefore, the sound bar 30 can be suitably used as a sound bar for a low-pitch range.

Fourth Embodiment

<Percussion Instrument>

Figure 10:
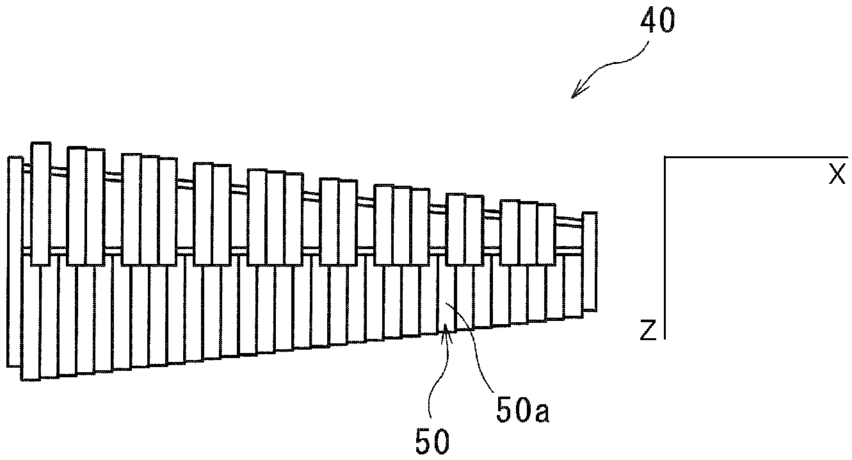
FIG. 10 is a schematic plan view illustrating a percussion instrument according to an embodiment of the present disclosure.

A percussion instrument 40 illustrated in FIG. 10 includes a plurality of sound bars 50. The plurality of sound bars 50 each include an elongated striking surface 50*a*. In at least one sound bar 50 of the plurality of sound bars 50, a weight of a striking surface side area defined in a range of a uniform thickness from the striking surface 50*a* changes along a longitudinal direction of the striking surface 50*a*. The percussion instrument 40 may include, for example, any one of the sound bar 10 illustrated in FIG. 1, the sound bar 20 illustrated in FIG. 6, and the sound bar 30 illustrated in FIG. 7 as the sound bar in which the weight of the striking surface side area changes along the longitudinal direction of the striking surface 50*a*. The percussion instrument 40 is, for example, a marimba, a xylophone, or a vibraphone.

The percussion instrument 40 includes, for example, two or more sound bars 50 in which the weight of the striking surface side area changes along the longitudinal direction of the striking surface 50*a*. For example, at least two sound bars 50 of the plurality of sound bars 50 are different in a weight increase/decrease direction along the longitudinal direction of the striking surface 50*a* in the striking surface side area (in other words, the at least two sound bars 50 are different in the degree of weight increase/decrease along the longitudinal direction of the striking surface 50*a* in the striking surface side area), or are different in an entire layer structure. For example, the sound bar 10 illustrated in FIG. 1, the sound bar 20 illustrated in FIG. 6, and the sound bar 30 illustrated in FIG. 7 are different in a layer structure from each other. The sound bars 10, 20, and 30 are different in the weight of both ends thereof, and are different in the thickness in the central area in the longitudinal direction of the striking surface of the sound bars 10, 20, and 30. The sound bar 30 illustrated in FIG. 7 is different in the weight increase/decrease direction along the longitudinal direction of the striking surface 50*a* in the striking surface side area from the sound bar 10 illustrated in FIG. 1 and the sound bar 20 illustrated in FIG. 6. By adopting a configuration of the percussion instrument 40 including two or more sound bars 50 that are different in the entire layer structure or are different in the weight increase/decrease direction along the longitudinal direction of the striking surface 50*a*, it is easy to control the sound quality, the pitch range, the strength, the thickness, and the like of the plurality of sound bars 50 to achieve a desired quality.

In the percussion instrument 40, for example, a material of an outermost layer on the striking surface 50*a* side is the same in all of the sound bars 50. In the percussion instrument 40, for example, surface layers of all of the sound bars 50 may be made of a wood material to make the material for the outermost layer on the striking surface 50*a* side the same, or the surface layers of all of the sound bars 50 may be made of a wood material impregnated with a dissimilar material to make the material for the outermost layer on the striking surface 50*a* side the same. In the percussion instrument 40, the material for the outermost layer on the striking surface side is made the same in all of the sound bars 50, and thus uniform quality of all the sound bars 50 can be easily achieved. For example, when a wood material is used as the material for the outermost layer on the striking surface side, the type of the wood material arranged on the outermost layer is made the same from a viewpoint of promoting uniformization of the quality of all of the sound bars 50. The wood grain of the wood material arranged on the outermost layer on the striking surface side or the type of the dissimilar material with which the wood material is to be impregnated may be the same. The types of coating and a coating material may be the same.

<Advantages>

The percussion instrument 40 includes the sound bar according to the present disclosure, and thus it is possible to improve a degree of freedom in designing the sound quality, the strength, an overall thickness, and the like of the sound bar.

Other Embodiments

The embodiments do not limit the configuration of the present disclosure. Therefore, in the embodiments, omission, substitution, or addition of components of each part of the embodiments can be made based on the description of the present specification and the common technical knowledge, and all of them should be interpreted as belonging to the scope of the present disclosure.

Figure 11:
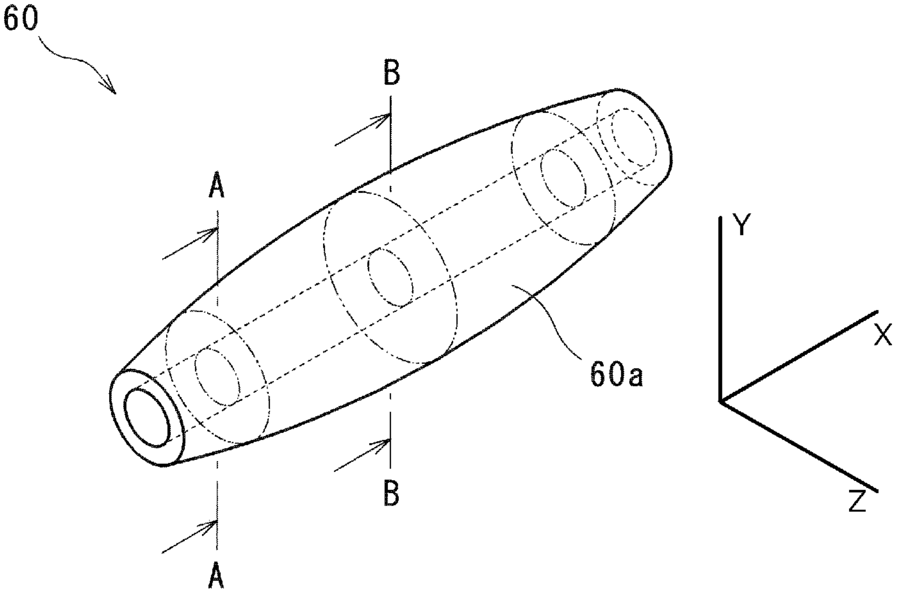
FIG. 11 is a schematic perspective view illustrating a sound bar according to an embodiment different from the sound bars illustrated in FIGS. 1, 6, and 7.
Figure 12:
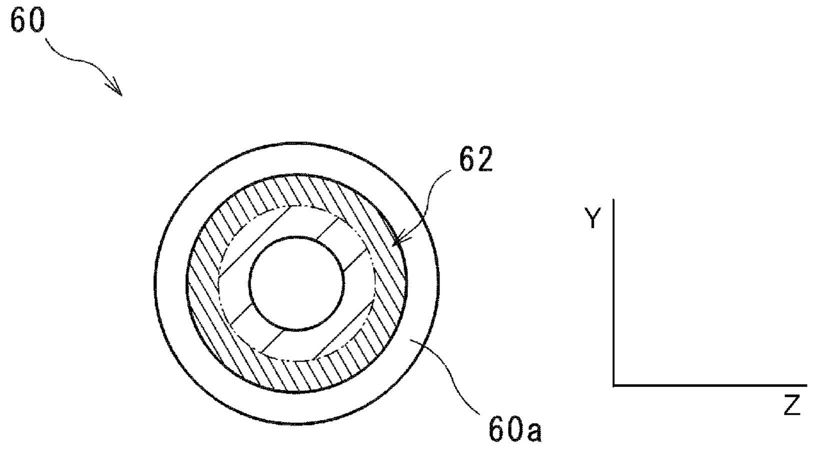
FIG. 12 is a cross-sectional view of the sound bar illustrated in FIG. 11 taken along a line A-A.
Figure 13:
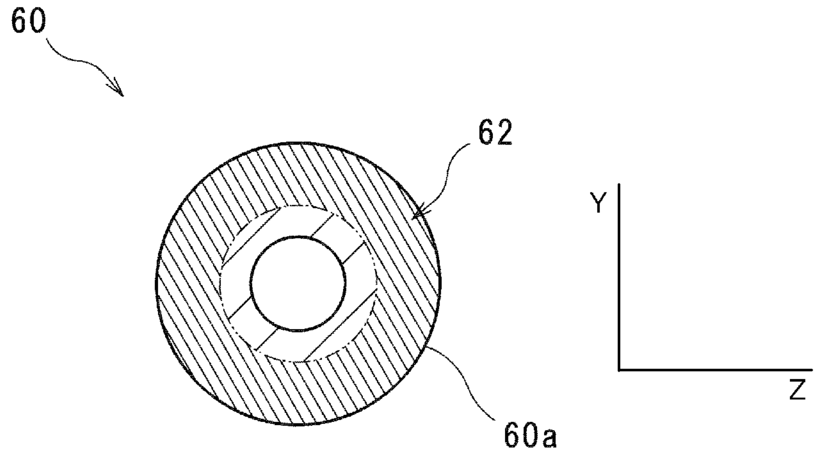
FIG. 13 is a cross-sectional view of the sound bar illustrated in FIG. 11 taken along a line B-B.

The sound bar is not limited to the configurations described in the first to third embodiments as long as the weight of the striking surface side area defined in the range of the uniform thickness from the striking surface changes along the longitudinal direction of the striking surface. As an example, the sound bar may have a configuration illustrated in FIGS. 11 to 13. A sound bar 60 illustrated in FIGS. 11 to 13 includes an elongated striking surface 60*a*. The sound bar 60 is tubular, and an outer peripheral surface thereof constitutes the striking surface 60*a*. A longitudinal direction of the striking surface 60*a* is along a central axis of the sound bar 60. As illustrated in FIGS. 12 and 13, the sound bar 60 is impregnated with a dissimilar material 62 in a thickness direction from the striking surface 60*a*. An impregnation amount of the dissimilar material 62 changes along the longitudinal direction of the striking surface 60*a*. With such a configuration, in the sound bar 60, a weight of a striking surface side area defined in a range of a uniform thickness from the striking surface 60*a* changes along a longitudinal direction of the striking surface 60*a*.

An increase/decrease direction is not particularly limited as long as the weight of the striking surface side area changes along the longitudinal direction of the striking surface. The weight of the striking surface side area may monotonically increase from a central area in the longitudinal direction of the striking surface toward both sides as in the configuration illustrated in FIG. 1, or may monotonically decrease from the central area in the longitudinal direction of the striking surface toward both sides as in the configuration illustrated in FIG. 7. More specifically, the thickness of the surface layer may monotonically increase from the central area in the longitudinal direction of the striking surface toward both sides as illustrated in FIG. 1, or the thickness of the surface layer may monotonically decrease from the central area in the longitudinal direction of the striking surface toward both sides as illustrated in FIG. 7. Further, the sound bar illustrated in FIG. 1 may be used for a low-pitch range, and the sound bar illustrated in FIG. 7 may be used for a high-pitch range.

In the configuration illustrated in FIG. 6 in which the dissimilar material is filled in fine holes, the shape and arrangement of the fine holes are not particularly limited. For example, in the sound bar, the impregnation amount of the dissimilar material may be changed along the longitudinal direction of the striking surface by changing the interval of the fine holes in the longitudinal direction of the striking surface. According to this configuration, the density of the dissimilar material may be changed while the impregnation depth of the dissimilar material is constant. In the sound bar, the impregnation amount of the dissimilar material may be changed along the longitudinal direction of the striking surface by changing a diameter of the fine hole, instead of the depth of the fine hole or together with the depth of the fine hole. Further, the interval, the depth, the diameter, and the like of the fine holes may be provided such that the content of the dissimilar material monotonously increases or monotonously decreases from the central area in the longitudinal direction of the striking surface toward both sides in the longitudinal direction.

The sound bar may include a layer other than the intermediate layer between the surface layer and the base.

In the above embodiments, configurations in which a wood material is impregnated with the dissimilar material are described. However, as the base material impregnated with the dissimilar material, for example, a woven fiber material or a non-woven fabric material may be used.

As a material constituting the intermediate layer, for example, a fiber reinforced plastic such as a carbon fiber reinforced plastic (CFRP) may be used.

When the surface layer contains a wood material, a wood grain of the wood material may not extend along a longitudinal direction of the striking surface. A fiber direction of the surface layer and a fiber direction of the intermediate layer may not be perpendicular to each other in a plan view.

For example, the fiber of the surface layer and the fiber of the intermediate layer may be arranged in parallel in a plan view.

A percussion instrument to which the sound bar is applied is not limited to the above percussion instruments. The sound bar may be used, for example, in a castanet, a woodblock, a cajon, a wooden drum, or a chime. A shape of the striking surface of the sound bar can be designed based on a percussion instrument to be applied.

As described above, the sound bar according to one aspect of the present disclosure is suitable for improving the degree of freedom in design.

What is claimed is:

1. A sound bar comprising:

an elongated member including a surface layer having a striking surface having an elongated shape, wherein a weight of a striking surface side area of the elongated member, per unit volume of the striking surface side area of the elongated member, changes along a longitudinal direction of the striking surface, the striking surface side area being an area sandwiched between the striking surface and a virtual surface that passes through a portion where a thickness of the surface layer is maximum and that is parallel to the striking surface.

2. The sound bar according to claim 1, wherein the elongated member is made of a first material, the elongated member is impregnated with a second material from the striking surface in a thickness direction of the elongated member, the second material being a different material than the first material, and an impregnation amount of the second material changes along the longitudinal direction of the striking surface.

3. The sound bar according to claim 2, wherein an impregnation depth of the second material monotonically increases or monotonically decreases from a central area of the elongated member in the longitudinal direction of the striking surface toward both sides of the elongated member in the longitudinal direction of the striking surface.

4. The sound bar according to claim 2, wherein in the striking surface side area, a density of the second material monotonically increases or monotonically decreases from a central area of the elongated member in the longitudinal direction of the striking surface toward both sides of the elongated member in the longitudinal direction of the striking surface.

5. The sound bar according to claim 1, wherein the surface layer further includes a fixing surface opposite across a thickness of the surface layer from the striking surface, the elongated member further comprises a base fixed to the fixing surface of the surface layer, a specific gravity of the surface layer is different from a specific gravity of the base, and a thickness of the surface layer changes along the longitudinal direction of the striking surface.

6. The sound bar according to claim 5, wherein the base is made of a wood material.

7. The sound bar according to claim 5, wherein the base comprises a plurality of laminated plates, and a lamination direction of the plurality of laminated plates is perpendicular to a thickness direction of the base.

8. The sound bar according to claim 5, wherein the surface layer contains oriented fibers.

9. The sound bar according to claim 8, wherein the elongated member further comprises an intermediate layer arranged between the surface layer and the base, the intermediate layer contains oriented fibers, and a fiber direction of the oriented fibers of the intermediate layer is perpendicular to a fiber direction of the oriented fibers of the surface layer in a plan view.

10. The sound bar according to claim 5, wherein the thickness of the surface layer monotonically increases or monotonically decreases from a central area of the elongated member in the longitudinal direction of the striking surface toward both sides of the elongated member in the longitudinal direction of the striking surface.

11. The sound bar according to claim 1, wherein the surface layer includes a plurality of holes, and the portion where the thickness of the surface layer is maximum is a deepest portion of the plurality of holes.

12. A percussion instrument comprising:

a plurality of sound bars, wherein each of at least two sound bars of the plurality of sound bars comprises an elongated member including a surface layer having a striking surface having an elongated shape, wherein a weight of a striking surface side area of the elongated member, per unit volume of the striking surface side area of the elongated member, changes along a longitudinal direction of the striking surface, the striking surface side area being an area sandwiched between the striking surface and a virtual surface that passes through a portion where a thickness of the surface layer is maximum and that is parallel to the striking surface, and wherein the at least two sound bars of the plurality of sound bars are different in a weight increase/decrease direction along the longitudinal direction of the striking surface in the striking surface side area from each other, or layer structures of the at least two sound bars are different from each other.

13. The percussion instrument according to claim 12, wherein the layer structures of the at least two sound bars are different from each other in a weight of both ends of the elongated member in the longitudinal direction of the striking surface or different from each other in a thickness of the elongated member in a central area of the elongated member in the longitudinal direction of the striking surface.

14. The percussion instrument according to claim 12, wherein a material of an outermost layer on a striking surface side of all sound bars of the plurality of sound bars is the same for all sound bars of the plurality of sound bars.

* * * * *